(12) United States Patent
Kreutziger et al.

(10) Patent No.: US 11,306,688 B2
(45) Date of Patent: Apr. 19, 2022

(54) LOW-PRESSURE EGR SYSTEM WITH TURBO BYPASS

(71) Applicant: TENNECO GMBH, Edenkoben (DE)

(72) Inventors: Philipp Kreutziger, Landau (DE); Michael Fischer, Mainz (DE); Jaroslaw Kierat, Frankenthal (DE)

(73) Assignee: TENNECO GMBH, Edenkoben (DE)

( * ) Notice: Subject to any disclaimer, the term of this patent is extended or adjusted under 35 U.S.C. 154(b) by 0 days.

(21) Appl. No.: 16/976,365

(22) PCT Filed: Feb. 28, 2019

(86) PCT No.: PCT/EP2019/054935
§ 371 (c)(1),
(2) Date: Aug. 27, 2020

(87) PCT Pub. No.: WO2019/166529
PCT Pub. Date: Sep. 6, 2019

(65) Prior Publication Data
US 2021/0140394 A1 May 13, 2021

(30) Foreign Application Priority Data
Feb. 28, 2018 (DE) .................. 10 2018 104 605.7

(51) Int. Cl.
*F02M 26/07* (2016.01)
*F02M 26/14* (2016.01)
(Continued)

(52) U.S. Cl.
CPC ......... *F02M 26/07* (2016.02); *B01D 46/0068* (2013.01); *B01D 46/0087* (2013.01);
(Continued)

(58) Field of Classification Search
CPC ........ F02M 26/07; F02M 26/06; F02M 26/14; F02M 26/17; F02M 35/10157;
(Continued)

(56) References Cited

U.S. PATENT DOCUMENTS 5,582,005 A 12/1996 Wunderlich et al.
9,404,448 B2 8/2016 Gokhale
(Continued)

FOREIGN PATENT DOCUMENTS

DE 102015108223 A1 12/2016
DE 202017105126 U1 9/2017
(Continued)

*Primary Examiner* — Audrey B. Walter

(57) ABSTRACT

The disclosure relates to a gasoline engine comprising an exhaust gas line which can be connected to an exhaust manifold of the gasoline engine, an intake line which can be connected to an intake manifold of the gasoline engine, a charge air compressor which is arranged in the intake line, and a turbine which is arranged in the exhaust gas line. The exhaust gas line has at least one bypass line with a bypass throttle valve, said line branching off from the exhaust gas line at a branch upstream of the turbine and branching back into the exhaust gas line at an opening downstream of the turbine. At least one exhaust gas recirculation line with an EGR throttle valve is provided, said line branching off from the exhaust gas line at a branch and opening into the intake line at an opening, wherein a coupling line with a first node point and a second node point is provided, the bypass line and the EGR line being combined in some sections in said coupling line; at least one particle filter is arranged in the coupling line; and the first node point is arranged downstream of the branch and downstream of the branch.

14 Claims, 4 Drawing Sheets

(51) Int. Cl.

| | | |
|---|---|---|
| *F02M 26/17* | (2016.01) | |
| *B01D 46/00* | (2006.01) | |
| *B01D 53/94* | (2006.01) | |
| *F01N 3/021* | (2006.01) | |
| *F01N 3/10* | (2006.01) | |
| *F01N 3/28* | (2006.01) | |
| *F02B 37/18* | (2006.01) | |
| *F02M 35/10* | (2006.01) | |
| *F01N 3/031* | (2006.01) | |
| *F02M 26/06* | (2016.01) | |

(52) U.S. Cl.
CPC ......... *B01D 53/9454* (2013.01); *F01N 3/021* (2013.01); *F01N 3/031* (2013.01); *F01N 3/101* (2013.01); *F01N 3/28* (2013.01); *F02B 37/18* (2013.01); *F02B 37/183* (2013.01); *F02M 26/06* (2016.02); *F02M 26/14* (2016.02); *F02M 26/17* (2016.02); *F02M 35/10157* (2013.01); *F02M 35/10222* (2013.01); *B01D 2255/915* (2013.01); *B01D 2279/30* (2013.01); *F01N 2370/02* (2013.01)

(58) Field of Classification Search
CPC . F02M 35/10222; F02B 37/18; F02B 37/183; F01N 3/031; F01N 3/021; F01N 3/101; F01N 3/28; F01N 2370/02; B01D 46/0068; B01D 46/0087; B01D 53/9454; B01D 2255/915; B01D 2279/30
See application file for complete search history.

(56) References Cited

U.S. PATENT DOCUMENTS

| | | | |
|---|---|---|---|
| 9,593,619 B2 | 3/2017 | Zhang | |
| 2006/0021346 A1* | 2/2006 | Whelan | F02D 9/04 60/605.2 |
| 2015/0260128 A1* | 9/2015 | Roth | F02M 26/05 123/568.13 |
| 2016/0348615 A1* | 12/2016 | Fischer | F02M 26/22 |
| 2018/0171903 A1* | 6/2018 | Aronsson | F02B 41/10 |

FOREIGN PATENT DOCUMENTS

| | | | | |
|---|---|---|---|---|
| FR | 2885178 A1 | | 11/2006 | |
| FR | 2894624 A1 | * | 6/2007 | ............ F02M 26/35 |
| JP | H07259654 A | | 10/1995 | |

\* cited by examiner

LOW-PRESSURE EGR SYSTEM WITH TURBO BYPASS

CROSS-REFERENCE TO RELATED APPLICATIONS

This application is a U.S. National Phase Application under 35 U.S.C. 371 of International Application No. PCT/EP2019/054935, filed on Feb. 28, 2019, which claims the benefit of German Patent Application No. 10 2018 104 605.7, filed on Feb. 28, 2018. The entire disclosures of the above applications are incorporated herein by reference.

FIELD

The disclosure relates to an exhaust gas conduction system for a gasoline engine, comprising an exhaust gas line which can be connected to an exhaust manifold of the gasoline engine, an intake line which can be connected to an intake manifold of the gasoline engine, and a charge air compressor which is arranged in the intake line, and a turbine which is arranged in the exhaust gas line, wherein the exhaust gas line has at least one bypass line with a bypass throttle valve, said line branching off from the exhaust gas line at a branch upstream of the turbine and branching back into the exhaust gas line at an opening downstream of the turbine, and wherein at least one exhaust gas recirculation line with an EGR throttle valve is provided, which branches off from the exhaust gas line at a branch and opening into the intake line, wherein a coupling line is provided with a first node point and with a second node point, in which the bypass line and the EGR line are combined in sections, wherein at least one particle filter is arranged in the coupling line, wherein an exhaust gas valve is provided in the exhaust gas line downstream of the branch of the exhaust gas recirculation line and upstream of the opening of the bypass line, and wherein the bypass line additionally has a bypass valve, which is positioned downstream of the first node point and upstream of the opening.

BACKGROUND

This section provides background information related to the present disclosure which is not necessarily prior art.

An exhaust gas conduction system for a gasoline engine is already known from DE 10 2015 108 223 A1. The exhaust gas conduction system has an exhaust gas recirculation line which opens in the intake line downstream of the compressor. Additionally, a bypass line is provided for the turbine, on which the exhaust gas recirculation line branches off. A particle filter is arranged in the exhaust gas recirculation line, wherein the particle filter has a catalytically active coating for converting CO, HC and NOx.

An exhaust gas conduction system for a gasoline engine with an exhaust gas recirculation line and a bypass line for the turbine is also known from U.S. Pat. No. 9,593,619, B2.

DE 20 2017 105 126 U1 describes an exhaust gas conduction system with an exhaust gas recirculation line and a bypass line, wherein a particle filter is provided which is positioned in the bypass line upstream of the branch of the exhaust gas recirculation line.

Unlike with a diesel engine, the particle filter of a gasoline engine regenerates largely without additional active measures, i.e. under normal gasoline engine framework conditions, the particle mass retained until that point (soot particles with accumulated or embedded hydrocarbons) essentially converts to $CO_2$ or $H_2O$ in the combustion process. For this purpose, sufficiently high exhaust gas temperatures of over 500° C. and oxygen are required in order for combustion to occur. This exhaust gas temperature is achieved in a very wide range of operations of the gasoline engine. Since the majority of gasoline engines are operated stochiometrically, the oxygen content in the exhaust gas may be too low for a full combustion of the particle mass contained in the filter. In such cases, in transient mode, the usual overrun cut-off phases of the gasoline engine help in which the injection of the engine is switched off for consumption reasons due to the lack of load requirement by the driver. In engine brake mode, pure air is flushed through the exhaust gas system as a result of the motored engine. This uncombusted air comes into contact with the particles in the particle filter that have been previously heated. If the temperature is sufficiently high, these particles catch fire and combust to gases that can escape through the particle filter. As a result, the particle filter is purified.

Fundamentally, a differentiation is made between three variants of the exhaust gas recirculation, depending on the branch of the EGR line from the exhaust gas line and the opening of the EGR line in the intake line. The combination of the branch of the EGR line upstream of the turbine or turbines and the opening of the EGR line downstream of the compressor or compressors is known as high-pressure EGR (HD-EGR or HP-EGR). The combination of the branch of the EGR line upstream of the turbine or turbines and the opening of the EGR line upstream of the compressor or compressors is known as maximum-pressure EGR (MD-EGR or MP-EGR). The combination used in connection with this disclosure of the branch of the EGR line downstream of the turbine or turbines and the opening upstream of the compressor or compressors is known as low-pressure EGR (ND-EGR or LP-EGR).

SUMMARY

This section provides a general summary of the disclosure, and is not a com-prehensive disclosure of its full scope or all of its features.

The object that forms the basis of the disclosure is to form and arrange an exhaust gas conduction system such that a broader area of use and improved exhaust gas purification are ensured.

The object is attained according to the disclosure by means of the fact that the first node point is positioned downstream of the branch of the exhaust gas recirculation line and downstream of the branch of the bypass line, and that the bypass throttle valve is positioned upstream of the first node point. As a result, it is achieved that the particle filter can be used in the EGR line not only in EGR mode, but also in bypass mode, as a result of which in cold start mode in particular, a very rapid heating or light-off is ensured. This is in particular due to the fact that the particle filter is designed for the exhaust gas volume flow to be recirculated; in other words, it is relatively small. When the gasoline engine is in partial load mode, when the bypass throttle valve is closed and the exhaust gas valve is open, the EGR exhaust gas flow is also guided through the particle filter.

For this purpose, it can also be advantageous when the at least one particle filter has a catalytically active 3-way coating for converting CO, HC and NOx. Thus, extensive purification of the recirculated exhaust gas is possible. Here, the cooler is protected against contamination and load with excessively acidic exhaust gas, so that optimal cooling is ensured.

Further, it can be advantageous when an EGR cooler is provided within the exhaust gas recirculation line upstream of the EGR throttle valve and downstream of the second node point. An optimal effect and efficiency of the cooler can be achieved due to the positioning of the cooler downstream of the particle filter.

It can also be advantageous when a 3-way exhaust gas catalytic converter and/or a particle filter is provided in the exhaust gas line. Thus, a purification of the main exhaust gas flow is achieved, in particular following sufficient heating of the exhaust gas.

Here, it can advantageously be provided that between the branch and the first node point, the exhaust gas recirculation line is free of exhaust gas valves or exhaust gas flaps. In this portion of the exhaust gas recirculation line, however, a valve may be required, since without a valve there is a possibility that the exhaust gases may flow over the turbocharger after all during the cold start phase, and thus the advantage of faster heating of the first purification unit can no longer be ensured.

It can be of particular importance for the present disclosure that a first portion of the exhaust gas recirculation line that extends between the branch and the first node point can be used as a bypass when the EGR throttle valve is closed and when the bypass valve is closed. This ensures an efficient line architecture.

In connection with the form and arrangement according to the disclosure, it can be advantageous when an exhaust gas valve is provided in the first portion of the exhaust gas recirculation line. This ensures an MP-EGR when the engine is in partial load mode.

It can further be advantageous that an HP exhaust gas recirculation line is provided with a branch downstream of the EGR cooler and an opening downstream of a charge air cooler. Thus, only one EGR cooler is required for both EGR modes, LP-EGR and HP-EGR.

Further, it can be advantageous when the particle filter is positioned in the exhaust gas line downstream of the branch of the exhaust gas recirculation line and upstream of the opening of the bypass line. Both particle filters can thus be regenerated via the coupling line. Both particle filters, in other words, the particle filter in the coupling line and the particle filter in the exhaust gas line, can be operated in parallel, making it possible to reduce the counterpressure.

Here, it can be advantageous when an exhaust gas diversion is provided, which branches off at a second node point downstream of the particle filter and which branches back in the exhaust gas line in an opening downstream of the 3-way catalytic converter and/or downstream of the particle filter, wherein at least one first diversion valve is positioned in the exhaust gas diversion. Thus, a bypass of the particle filter and/or of the 3-way catalytic converter in the main exhaust gas tract is possible. The diversion section ensures a bypass of the particle filter in the main exhaust gas tract in order to reduce the pressure loss. Lower pressure loss and lower counterpressure lead to improved fuel consumption. Here, the bypass valve should be closed, since otherwise, unpurified exhaust gas may escape.

Finally, it can be advantageous when a diversion section is provided which branches off at a branch after the first diversion valve and branches back at an opening between the particle filter and the 3-way catalytic converter, wherein a second diversion valve is provided in the diversion section and a third diversion valve is provided in the exhaust gas diversion downstream of the branch. Thus, as an alternative, a bypass of the particle filter in the main exhaust gas tract alone is possible in order to take increased pressure losses into account.

Furthermore, the object is attained by a method for operating a gasoline engine with an aforementioned exhaust gas conduction system or a corresponding exhaust gas system, in which:

a) when the gasoline engine is in cold starting mode, the bypass throttle valve and the bypass valve are open and the EGR throttle valve and the exhaust gas valve are closed, so that the exhaust gas flow is guided past the turbine through the bypass line and the particle filter, b) when the gasoline engine is in partial load mode, the bypass throttle valve and the bypass valve are closed and the exhaust gas valve is open, wherein depending on the operating point, an exhaust gas mass flow is adjusted within the exhaust gas recirculation line via the EGR throttle valve, c) when the gasoline engine is in full load mode or at least close to full load mode, the EGR throttle valve and the bypass valve are closed and the exhaust gas valve is open, wherein an exhaust gas mass flow that is designed to bypass the turbine is guided to the exhaust gas line via the bypass line and the first portion of the exhaust gas recirculation line, wherein depending on the operating point, the exhaust gas mass flow designed to bypass is adjusted via the bypass throttle valve.

In full load mode, an exhaust gas recirculation is also possible via the HP-exhaust gas recirculation line, wherein the HP-EGR throttle valve is regulated.

For this purpose, it can be advantageous when via the HP-EGR line and the LP-EGR line, charge air is introduced into the exhaust gas line and the particle filter in the EGR line and/or the particle filter in the exhaust gas line is regenerated.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further advantages and details of the disclosure are explained in the claims and in the description, and portrayed in the figures, in which:

Corresponding reference numerals indicate corresponding parts throughout the several views of the drawings.

DETAILED DESCRIPTION

Example embodiments will now be described more fully with reference to the accompanying drawings.

Figure 1:
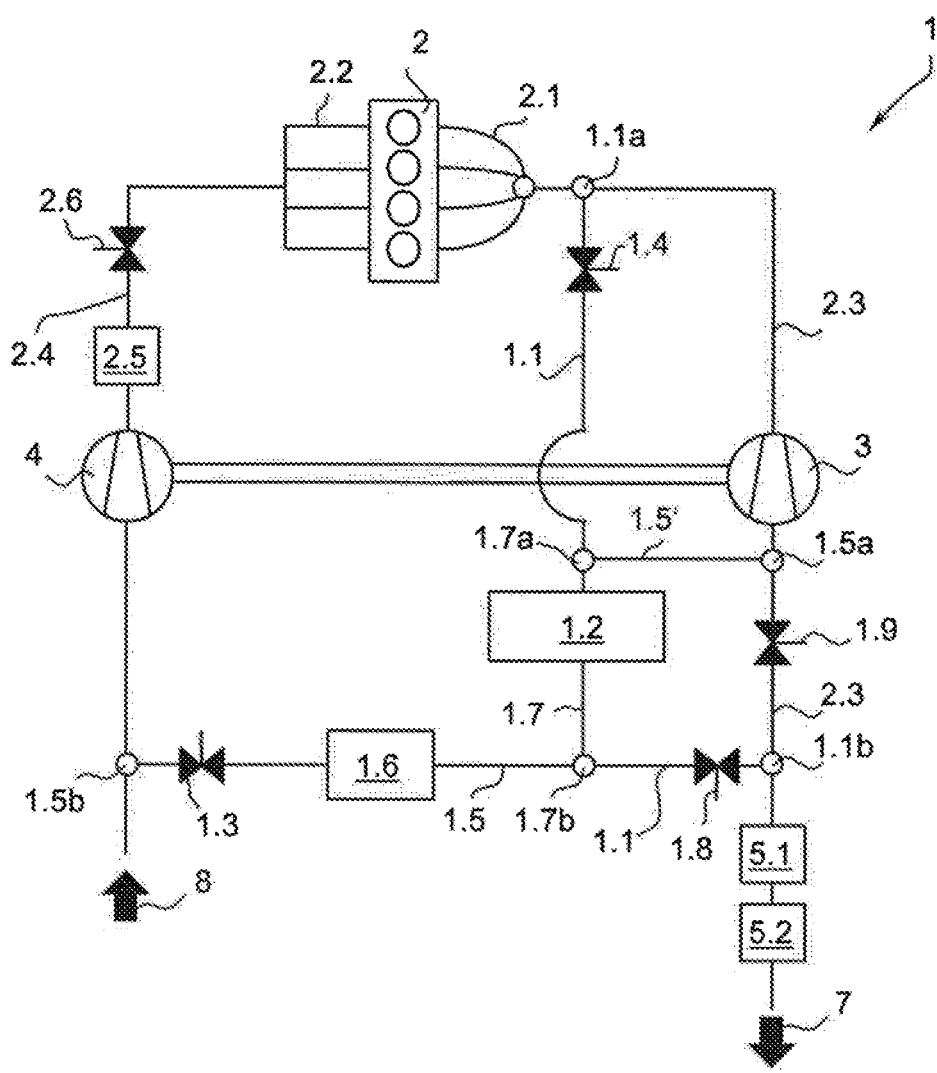
FIG. 1 shows a principle sketch of an exhaust gas conduction system with a bypass line with integrated LP-EGR.
Figure 2:
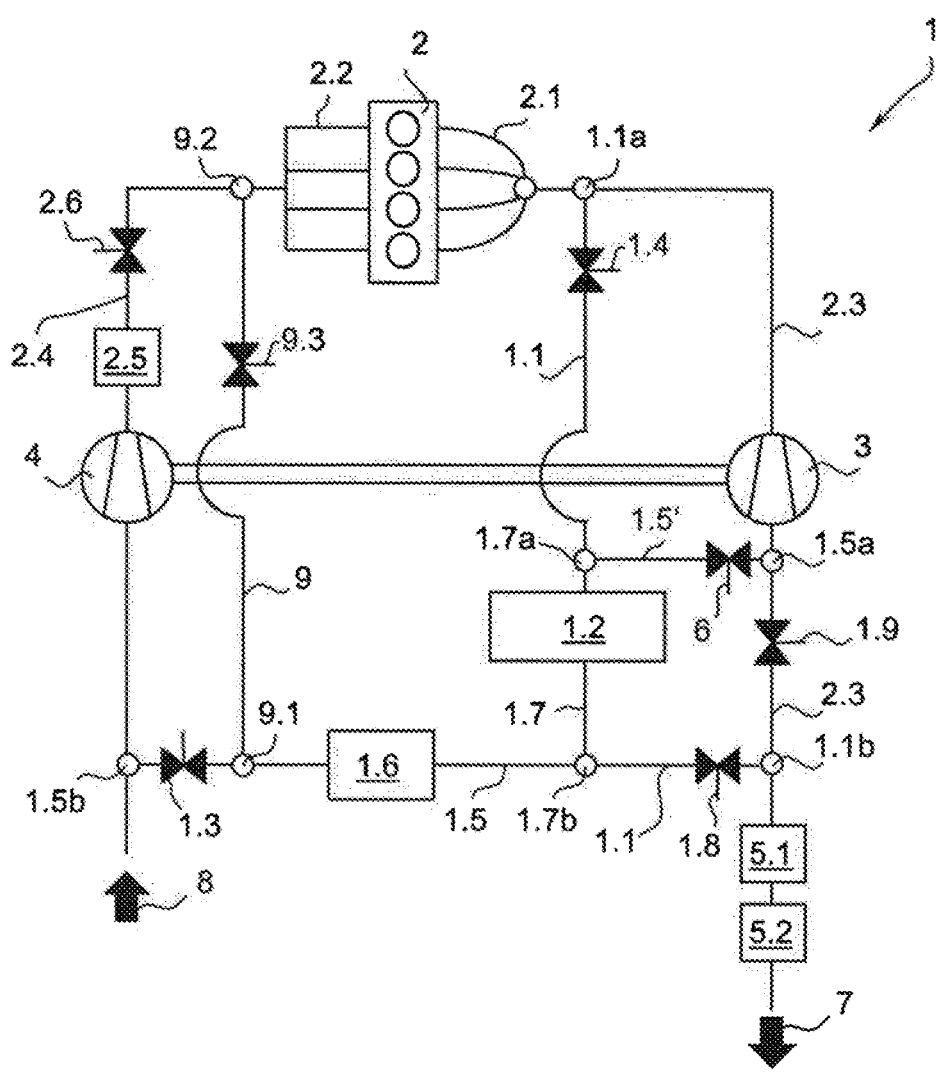
FIG. 2 shows a principle sketch according to FIG. 1 with HP-EGR.
Figure 3:
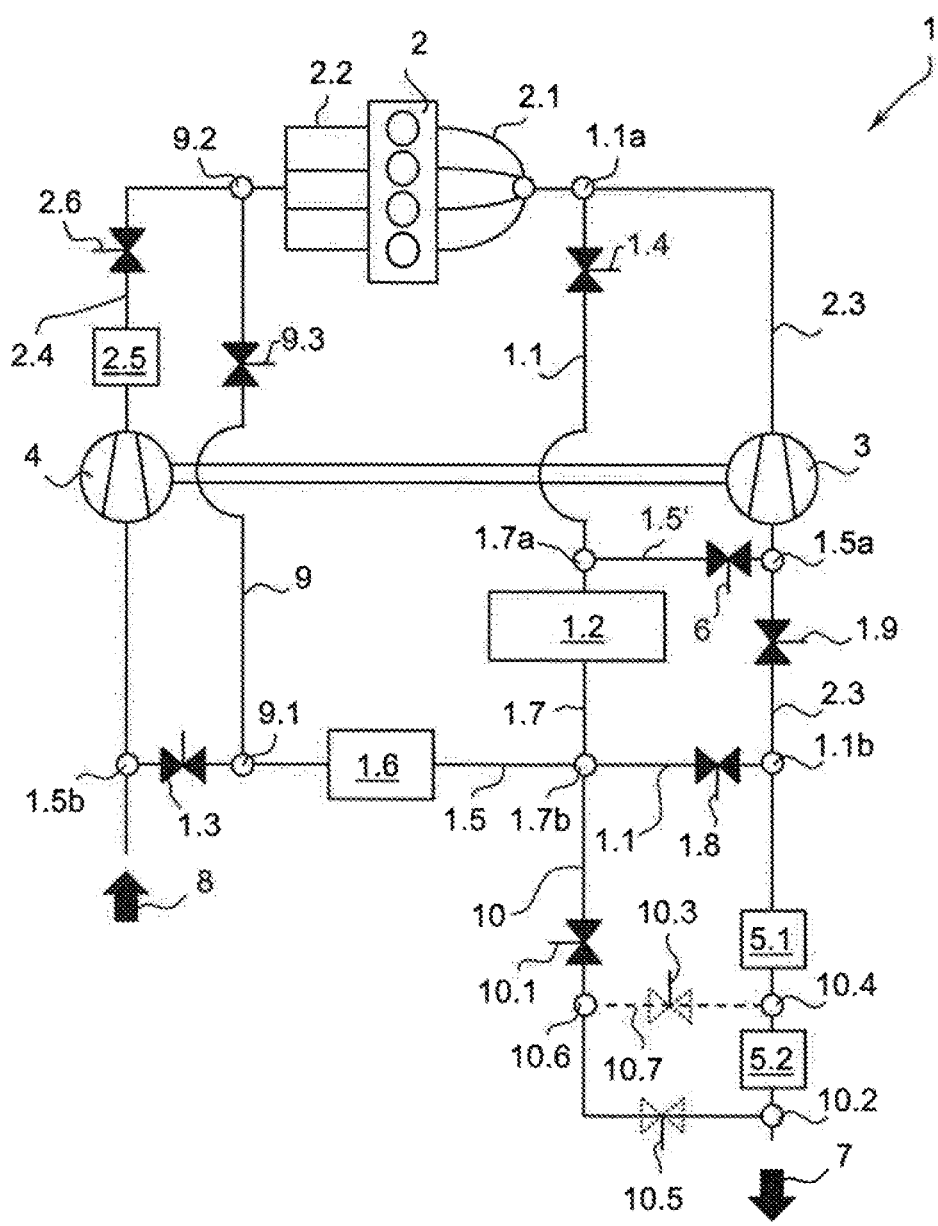
FIG. 3 shows a principle sketch according to FIG. 2 with diversion.

In all principle sketches according to the exemplary embodiments shown in FIGS. 1 to 3, an exhaust gas conduction system 1 (EGR system) is shown which is integrated into the exhaust gas and charge air system of a gasoline engine 2 with an exhaust manifold 2.1 and an intake manifold 2.2 and with an exhaust gas turbine 3 and a charge air compressor 4. The exhaust gas and charge air system has an exhaust gas line 2.3 that is connected to the exhaust manifold 2.1 of the gasoline engine 2, into which the turbine 3 is integrated. At the end of the exhaust gas line 2.3, the exhaust gas 7 leaves the exhaust gas system 1 and flows into the additional exhaust gas path not shown. Additionally, an intake line 2.4 is provided that is connected to the intake manifold 2.2 of the gasoline engine 2, into which the compressor 4 is integrated. The intake line 2.4 is supplied with fresh air 8 via an air feed system, not shown. Additionally, a bypass line 1.1 is provided that branches off from a branch 1.1a on the exhaust gas line 2.3 and which branches back downstream of the turbine 3 at an opening 1.1b in the exhaust gas line 2.3. The bypass line 1.1 has a bypass throttle valve 1.4 for regulating the gas mass flow.

In addition, at least one exhaust gas recirculation line 1.5, 1.5' (EGR line) is provided with an EGR throttle valve 1.3 which branches off from a branch 1.5a on the exhaust gas line 2.3, and which branches back in the intake line 2.4 at an opening 1.5b upstream of the compressor 4. The EGR line 1.5 has an EGR cooler 1.6. An EGR throttle valve 1.3 for regulating the mass flow within the EGR line 1.1 is positioned downstream of the EGR cooler 1.6 or before the opening 1.5b into the intake line 2.4.

The EGR line 1.5 and the bypass line 1.1 open in a first node point 1.7a in a shared coupling line 1.7. The coupling line 1.7 has a second node point 1.7b on which the bypass line 1.1 and the EGR line 1.5 again run separately from each other. A particle filter 1.2 is provided in the coupling line 1.7 for purifying the exhaust gas 7 to be recirculated. The particle filter 1.2 is coated with a 3-way coating and additionally performs the tasks of a 3-way catalytic converter.

An exhaust gas valve 1.9 is arranged downstream of the turbine 3 and upstream of an opening 1.1b of the bypass line 1.1. In the further path following the opening 1.1b of the bypass line 1.1, a 3-way catalytic converter 5.1 and a particle filter 5.2 are provided in the exhaust gas line 2.3. These two purification components can also be formed as a combined 4-way catalytic converter in the form of a particle filter with a 3-way coating.

A charge air cooler 2.5 and a charge air throttle valve 2.6 are provided in the intake line 2.4.

When the gasoline engine 2 is in cold start mode, the bypass throttle valve 1.4 and a bypass valve 1.8 are open. The EGR throttle valve 1.3 and the exhaust gas valve 1.9 are closed, so that the exhaust gas flow is guided through the bypass line 1.1 past the particle filter 1.2 on the turbine 3, which leads to rapid heating of the particle filter 1.2. The particle filter 1.2 is relatively small, since it is only designed for the exhaust gas volume flow to be recirculated and for the exhaust gas mass flow in the cold start phase. However, in the cold start phase, it ensures optimal pre-purification of the exhaust gas before it is finally purified by the 3-way catalytic converter 5.1 and the particle filter 5.2.

When the gasoline engine 2 is in partial load mode, the bypass throttle valve 1.4 and the bypass valve 1.8 are closed and the exhaust gas valve 1.9 is open. Depending on the operating point, an exhaust gas mass flow is adjusted within the EGR line 1.5 via the EGR throttle valve 1.3.

When the gasoline engine 2 is in full load mode or at least close to full load mode, the EGR throttle valve 1.3 and the bypass valve 1.8 are closed and the exhaust gas valve 1.9 is open. Depending on the operating point, an exhaust gas mass flow to be guided past the turbine 3 is adjusted via the bypass throttle valve 1.4. The exhaust gas mass flow is introduced to the exhaust gas line 2.3 via the bypass line 1.1 and a first portion 1.5' of the exhaust gas recirculation line 1.5.

In general, due to the already existent oxygen excess in the exhaust gas 7, a regeneration of the particle filters 1.5, 5.2 is possible via oxidation of the filtered particles when the engine is in overrun mode.

According to FIG. 2, a high-pressure exhaust gas recirculation line 9 (HP-EGR line) is provided, which can be used as an alternative for recirculating charge air. The HP-EGR line 9 has an HP-EGR throttle valve 9.3, a branch 9.1 downstream of the EGR cooler 1.6 and an opening 9.2 downstream of a charge air cooler 2.5. Additionally, an exhaust gas valve 6 is provided, which is positioned in the portion 1.5' of the EGR line 1.5 between the first node point 1.7a and the branch 1.5a. In HP-EGR mode, the exhaust gas valve 6, the bypass valve 1.8 and the LP-EGR throttle valve 1.3 are closed. Depending on the operating point, an exhaust gas mass flow is adjusted within the HP-EGR line 9 via the HP-EGR throttle valve 9.3. The main exhaust gas mass flow is guided through the exhaust gas line 2.3 over the open exhaust gas valve 1.9.

According to the exemplary embodiment shown in FIG. 3, an exhaust gas diversion 10 is provided. The exhaust gas diversion 10 branches off at the second node point 1.7b and branches back in the exhaust gas line 2.3 downstream of the particle filter 5.2 in an opening 10.2. A first diversion valve 10.1 is provided in the exhaust gas diversion 10, via which the exhaust gas diversion 10 can be sealed off. Via the exhaust gas diversion 10, the exhaust gas 7 can be guided past the two main purification components, the 3-way catalytic converter 5.1 and the particle filter 5.2.

In addition, a further diversion section 10.7 on the exhaust gas diversion 10 is provided (shown as a broken line). The diversion section 10.7 branches off at a branch 10.6 downstream of the first diversion valve 10.1 and branches back between the 3-way catalytic converter and the particle filter 5.2. In addition, a second diversion valve 10.3 and a third diversion valve 10.5 are provided, so that the exhaust gas flow can be recirculated into the exhaust gas line 2.3 either between the 3-way catalytic converter 5.1 and the particle filter 5.2 or after the particle filter 5.2.

Figure 4:
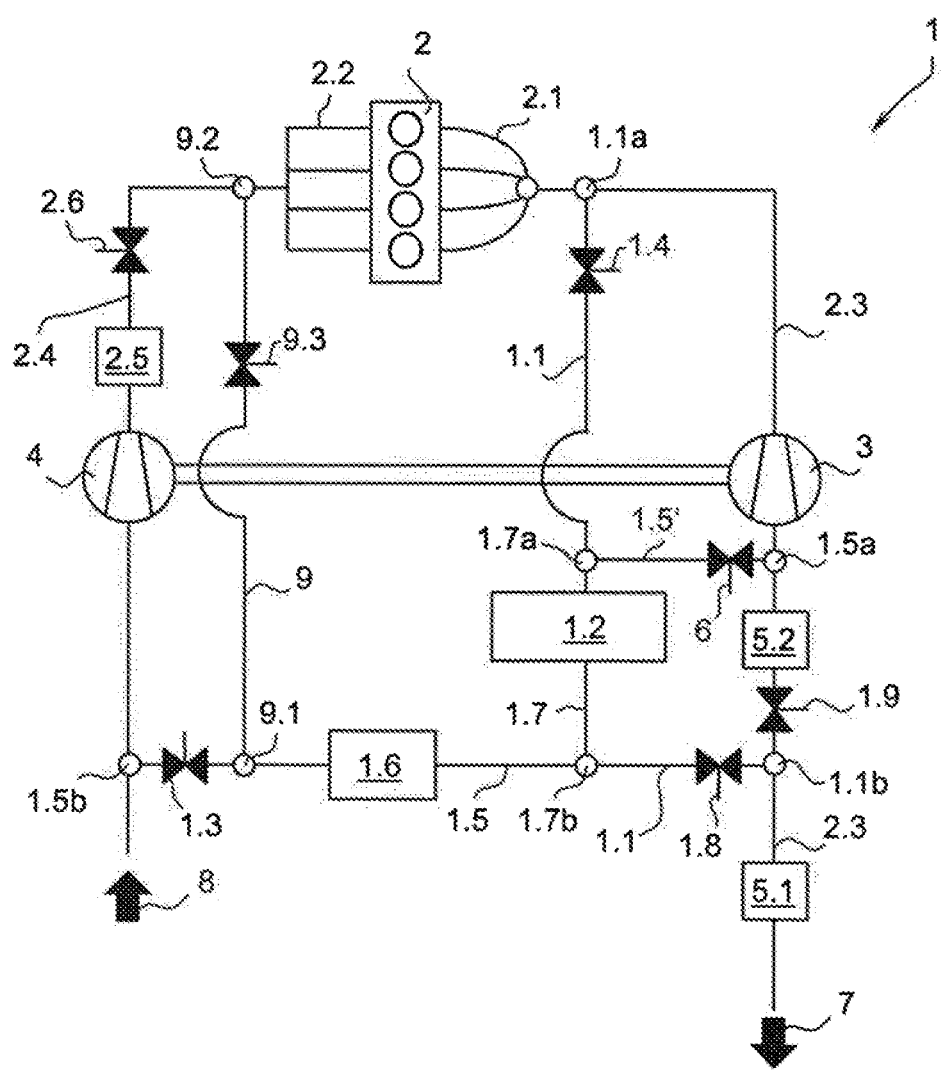
FIG. 4 shows a principle sketch according to FIG. 2 with a modified position of the particle filter.

According to the exemplary embodiment shown in FIG. 4, the particle filter 5.2 is positioned between the branch 1.5a and the exhaust gas valve 1.9. For the purpose of regeneration, charge air can be guided into the particle filter 1.2 and further into the exhaust gas line 2.3 and the particle filter 5.2 positioned there via the HP-EGR line 9 and the LP-EGR line 1.5 and via the coupling line 1.7.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. An exhaust gas conduction system for a gasoline engine comprising an exhaust gas line which can be connected to an exhaust manifold of the gasoline engine, an intake line which can be connected to an intake manifold of the gasoline engine, a charge air compressor, which is arranged in the intake line, and a turbine, which is arranged in the exhaust gas line, wherein the exhaust gas line has a bypass line with a bypass throttle valve, said bypass line branching off at a branch and branching back into the exhaust gas line at an opening, and wherein an exhaust gas recirculation line with an EGR throttle valve is provided, said recirculation line branching off from the exhaust gas line at a branch and opening into the intake line at an opening, wherein a coupling line with a first node point and a downstream second node point is provided, the bypass line and the EGR line being combined in some sections in said coupling line, wherein a particle filter is arranged in the coupling line, wherein the bypass line additionally has a bypass valve, which is positioned downstream of the first node point and upstream of the opening of the bypass line, wherein said bypass line branching off from the exhaust gas line upstream of the turbine wherein the first node point is positioned downstream of the branch of the exhaust gas recirculation line and downstream of the branch of the bypass line and in that the bypass throttle valve is positioned upstream of the first node point wherein an exhaust gas valve is provided in the exhaust gas line downstream of the branch of the exhaust gas recirculation line and upstream of the opening of the bypass line.

2. The exhaust gas conduction system according to claim 1, wherein
the particle filter has a catalytically active 3-way coating for converting CO, HC and NOx.

3. The exhaust gas conduction system according to claim 1, wherein
an EGR cooler is provided within the exhaust gas recirculation line upstream of the EGR throttle valve and downstream of the second node point.

4. The exhaust gas conduction system according to claim 1, wherein
a 3-way exhaust gas catalytic converter and/or another particle filter is provided in the exhaust gas line downstream of the opening of the bypass line.

5. The exhaust gas conduction system according to claim 1, wherein
the exhaust gas recirculation line is free of exhaust gas valves or exhaust gas flaps between the branch of the recirculation line and the first node point.

6. The exhaust gas conduction system according to claim 1, wherein
when the EGR throttle valve is closed and when the bypass valve is closed, a first portion of the exhaust gas recirculation line, which extends between the branch of the recirculation line and the first node point can be used as a bypass.

7. The exhaust gas conduction system according to claim 6, wherein
an exhaust gas valve is provided in the first portion of the exhaust gas recirculation line.

8. The exhaust gas conduction system according to claim 1, wherein
an HP exhaust gas recirculation line is provided which has a branch downstream of the EGR cooler and an opening downstream of a charge air cooler.

9. The exhaust gas conduction system according to claim 1, wherein
another particle filter is positioned in the exhaust gas line downstream of the branch of the exhaust gas recirculation line and upstream of the opening of the bypass line.

10. The exhaust gas conduction system according to claim 1, wherein
an exhaust gas diversion is provided, which branches off at the second node point downstream of the particle filter and branches back into the exhaust gas line in an opening downstream of a 3-way catalytic converter and/or downstream of another particle filter, wherein a first diversion valve is positioned in the exhaust gas diversion.

11. The exhaust gas conduction system according to claim 10, wherein
a diversion section is provided which branches off at a branch after the first diversion valve and branches back at an opening between the another particle filter and the 3-way catalytic converter, wherein a second diversion valve is provided in the diversion section and a third diversion valve is provided in the exhaust gas diversion downstream of the branch of the diversion section.

12. An exhaust gas system and/or gasoline engine comprising an exhaust gas conduction system according to claim 1.

13. A method for operating a gasoline engine with an exhaust gas conduction system or an exhaust gas system according to claim 1, wherein
a) in response to the gasoline engine being in cold starting mode, the bypass throttle valve and the bypass valve are open and the EGR throttle valve and the exhaust gas valve are closed, so that the exhaust gas flow is guided past the turbine through the bypass line and the particle filter,
b) in response to the gasoline engine being in partial load mode, the bypass throttle valve and the bypass valve are closed and the exhaust gas valve is open, wherein depending on the operating point of the engine, an exhaust gas mass flow within the exhaust gas recirculation line is adjusted via the EGR throttle valve, and
c) in response to the gasoline engine being in full load mode, the EGR throttle valve and the bypass valve are closed and the exhaust gas valve is open, wherein an exhaust gas mass flow that is designed to bypass the turbine is guided to the exhaust gas line via the bypass line and the first portion of the exhaust gas recirculation line, wherein the exhaust gas mass flow designed to bypass is adjusted via the bypass throttle valve depending on the operating point of the engine.

14. The method according to claim 13, wherein
charge air is introduced into the exhaust gas line via a HPR-EGR line and a LP-EGR line and the particle filter is regenerated.

* * * * *